United States Patent
Dahlberg et al.

(10) Patent No.: US 8,013,552 B2
(45) Date of Patent: Sep. 6, 2011

(54) SYSTEMS AND METHODS FOR CONTROLLING A DC MOTOR

(75) Inventors: James A. Dahlberg, Eagan, MN (US);
Ross S. Wilson, Menlo Park, CA (US);
Jason P. Brenden, Woodbury, MN (US)

(73) Assignee: Agere Systems Inc., Allentown, PA (US)

( * ) Notice: Subject to any disclaimer, the term of this patent is extended or adjusted under 35 U.S.C. 154(b) by 366 days.

(21) Appl. No.: 12/374,304

(22) PCT Filed: Sep. 26, 2006

(86) PCT No.: PCT/US2006/037445
§ 371 (c)(1),
(2), (4) Date: Jan. 17, 2009

(87) PCT Pub. No.: WO2008/039183
PCT Pub. Date: Apr. 3, 2008

(65) Prior Publication Data
US 2009/0322266 A1    Dec. 31, 2009

(51) Int. Cl.
*H02P 6/04* (2006.01)
(52) U.S. Cl. .................. 318/400.11; 318/254; 318/432; 318/603; 318/599
(58) Field of Classification Search ............. 318/400.11, 318/254, 432, 599, 603; 310/316
See application file for complete search history.

(56) References Cited

U.S. PATENT DOCUMENTS

| 5,493,163 A * | 2/1996 | Nishikawa ............... 310/316.02 |
| 5,616,979 A * | 4/1997 | Nishikawa ............... 310/316.02 |
| 7,034,478 B2 * | 4/2006 | Bhaumik et al. ......... 318/400.35 |
| 2005/0163237 A1 | 7/2005 | Katanya |
| 2005/0174076 A1 | 8/2005 | Katanya |
| 2006/0066280 A1 * | 3/2006 | Bhaumik et al. .............. 318/599 |

OTHER PUBLICATIONS

Yoon, Taeyong Stator Design Consideration of a Brushless DC Motor for Robust Rotor Position Detection in Inductive Sense Start-up IEEE Trans. On Magnetics, vol. 42,No. 3 Mar. 2006.

* cited by examiner

*Primary Examiner* — Paul Ip
(74) *Attorney, Agent, or Firm* — Hamilton DeSanctis & Cha (57) ABSTRACT

Various systems and methods for controlling DC motors are disclosed herein. For example, one method provides for controlling a polyphase, brushless DC motor. The method includes providing a DC motor that has a plurality of phases. Such a DC motor operates by inducing a current in the plurality of phases in accordance with a plurality of commutation states. In the example, six commutation states are discussed, but fewer than or more than six commutation states may exist. The method further includes initializing a count, inducing a current in the plurality of phases in accordance with a first commutation state, and incrementing the count until the current achieves a threshold in the first commutation state. Then, a current is induced in the plurality of phases in accordance with a second commutation state, and the count is decremented until the current achieves the threshold in the second commutation state. The sign bit of the count is stored, and a desired initial commutation state is determined based at least in part on the sign bit of the count.

21 Claims, 4 Drawing Sheets

SYSTEMS AND METHODS FOR CONTROLLING A DC MOTOR

BACKGROUND OF THE INVENTION

The present invention is directed to DC motors, and more particularly to control of a DC motor used to spin a magnetic storage medium in relation to a read/write head assembly.

A magnetic storage medium is attached to a spindle that is rotated by a DC motor in a typical hard disk drive. Such DC motors are often conventional polyphase, brushless DC motors that are highly efficient and possess characteristics that make them suitable for a number of applications. Polyphase, brushless DC motors require application of voltage to armature windings in sequential order (i.e., commutation states) to produce torque-inducing flux for moving a rotor. For proper operation, the commutation state sequence must be timed to match the current rotor position at any point in time. Thus, for example, where a three phase, brushless DC motor is utilized, voltage is applied across pairs of armatures in a sequential order. The magnetic flux created by applying the aforementioned voltages across the armatures results in a torque on the motor that causes rotational movement. When the brushless DC motor is spinning, the timing for applying the aforementioned currents can be obtained by detecting zero crossings of the back electro motive force of the motor and locking to the zero crossings with an analog or digital locking circuit (e.g., a PLL or a DLL).

There are not any zero crossings to lock to when a DC motor is initially starting. Thus, another mechanism must be applied to govern the sequential timing of the applied voltages. In one particular case, the DC motor is initially forced to a known position. This can be done, for example, by applying a voltage to one or more randomly selected armatures to cause the motor to snap into a known position. This approach, however, has two potential drawbacks. First, when a current is applied to a randomly selected armature, the motor may move in a direction opposite that of the normal rotational direction. This is unacceptable for a disk drive that brings the read/write head assembly to rest on the spindle platter as a direction reversal can damage the read/write head assembly.

Second, to ensure that the DC motor moves to the proper position, the motor typically must be driven to two known states. Two states are required to cover the case where the initial rotor position is in a zero torque state for the state that is being driven. After each movement, a spindle associated with the motor will mechanically ring. To avoid the deleterious effects of such ringing, a delay is introduced between the two movements and after the second movement to allow the ringing to stop or at least diminish to an acceptable level. These delays can be substantial, and result in an undesirable delay in the time required to access a magnetic storage medium associated with the motor.

Hence, for at least the aforementioned reasons, there exists a need in the art for advanced systems and methods for controlling DC motors.

BRIEF SUMMARY OF THE INVENTION

The present invention is directed to DC motors, and more particularly to control of a DC motor used to spin a magnetic storage medium in relation to a read/write head assembly.

Some embodiments of the present invention provide DC motor controllers. The DC motor controllers include a period detector that is operable to detect a period associated with a DC motor including a plurality of phases. Operating the DC motor includes inducing a current in the plurality of phases in accordance with a plurality of commutation states. The aforementioned commutation states include at least a first commutation state and a second commutation state. The aforementioned controllers further include a single register interval generator that is configurable to perform at least two functions: to generate timing intervals based on the period associated with the DC motor; and to provide an up/down counter. The controllers further include an initial commutation state controller that is operable to initialize the up/down counter, induce a current in the plurality of phases in accordance with the first commutation state, and increment the up/down counter until the current achieves a threshold in the first commutation state. Further, the initial commutation state controller is operable to induce a current in the plurality of phases in accordance with the second commutation state, and to decrement the up/down counter until the current achieves the threshold in the second commutation state. The sign bit achieved by incrementing and then decrementing the up/down counter is stored, and used to determine a desired initial commutation state.

In some cases of the aforementioned embodiments, the DC motor has at least three phases and at least six commutation states. The previously discussed first and second commutation states are treated as a first commutation state pair. The other four commutation states (i.e., a third commutation state, a fourth commutation state, a fifth commutation state and a sixth commutation state) are treated as two additional commutation state pairs (i.e., a second commutation state pair comprising the third commutation state and the fourth commutation state, and a third commutation state pair comprising the fifth commutation state and the sixth commutation state). It should be noted that the pairs utilized to determine position do not necessarily correspond to pairs and/or sequence used to drive the motor. In such cases, the previously discussed sign bit is a first sign bit associated with the first commutation state pair. The initial commutation state controller may be further operable to initialize the up/down counter, induce a current in the plurality of phases in accordance with the third commutation state, and increment the up/down counter until the current achieves a threshold in the third commutation state; and to induce a current in the plurality of phases in accordance with the fourth commutation state, and to decrement the up/down counter until the current achieves the threshold in the fourth commutation state. The sign bit is then stored as a second sign bit associated with the second commutation state pair. In addition, the initial commutation state controller is operable to initialize the up/down counter, induce a current in the plurality of phases in accordance with the fifth commutation state, and increment the up/down counter until the current achieves a threshold in the fifth commutation state; and to induce a current in the plurality of phases in accordance with the sixth commutation state, and to decrement the up/down counter until the current achieves the threshold in the sixth commutation state. The sign bit is then stored as a third sign bit associated with the third commutation state pair. The three sign bits are then used to determine a desired initial commutation state.

In particular cases, the aforementioned controllers include a sign bit register. In such cases, the three sign bits are arranged as a three bit array in the sign bit register, and determining the desired initial commutation state includes decoding the three bit array. Determining the desired initial commutation state may include determining the current commutation state, and selecting the desired initial commutation state to be one or two commutation states after the current commutation state.

Other embodiments of the present invention provide methods for controlling a polyphase, brushless DC motor. The methods include providing a DC motor that has a plurality of phases. Such a DC motor operates by inducing a current in the plurality of phases in accordance with a plurality of at least a first and second commutation states. The methods further include initializing a count, inducing a current to the plurality of phases in accordance with a first commutation state, and incrementing the count until the current achieves a threshold in the first commutation state. Then, the current is induced in the plurality of phases in accordance with a second commutation state, and the count is decremented until the current achieves the threshold in the second commutation state. The sign bit of the count is stored, and a desired initial commutation state is determined based at least in part on the sign bit of the count. In some cases, inducing the current in accordance with the first commutation state and incrementing the count, and inducing the current in accordance with the second commutation state and decrementing the count is repeated a programmable number of times before storing the sign bit of the count. In one particular case, the programmable number of times is sixteen.

In various cases of the aforementioned methods, the DC motor has at least three phases and at least six commutation states. The processes discussed above are repeated for each of the commutation states resulting in three sign bits that can be used together to determine an initial commutation state. In some cases, the processes are repeated a programmable number of times for each pair of the commutation states. In one particular case, the programmable number of times is sixteen.

Yet other embodiments of the present invention provide DC motor systems that include a DC motor with a plurality of phases. Operating the DC motor includes inducing a current in the plurality of phases in accordance with a plurality of commutation states. The aforementioned commutation states include at least a first commutation state and a second commutation state. The systems further include an initial commutation state controller that includes an up/down counter. The initial commutation state controller is operable to initialize the up/down counter, induce a current to the plurality of phases in accordance with the first commutation state, and increment the up/down counter until the current achieves a threshold in the first commutation state. Further, the initial commutation state controller is operable to induce a current to the plurality of phases in accordance with the second commutation state, and to decrement the up/down counter until the current achieves the threshold in the second commutation state. The sign bit achieved by incrementing and then decrementing the up/down counter is stored, and used to determine a desired initial commutation state.

This summary provides only a general outline of some embodiments according to the present invention. Many other objects, features, advantages and other embodiments of the present invention will become more fully apparent from the following detailed description, the appended claims and the accompanying figures.

BRIEF DESCRIPTION OF THE FIGURES

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is directed to DC motors, and more particularly to control of a DC motor used to spin a magnetic storage medium in relation to a read/write head assembly.

Some embodiments of the present invention avoid the disadvantages of the forced-state method discussed above by applying a novel algorithm to sense the initial position of the rotor magnets relative to the stator. Based on this information, an initial commutation state may be chosen that limits the potential for the associated motor to begin in a reverse direction. Thus, various embodiments of the present invention limit the potential for damage to a hard disk drive platter upon which a read/write head assembly is parked. In some cases, sensing the initial position is done by applying small currents to the motor and determining a time required for the currents to ramp to a predetermined threshold value. Inducing small currents can be done, for example, by applying a fixed voltage to the motor over a limited period. This results in a ramping current traversing the involved motor windings. The time required to ramp to the predetermined current threshold provides a value that is proportional to the inductance of the motor windings as measured in each commutation state. This inductance varies dependent upon the starting rotor position of the motor. In some cases, the current is induced across pairs of three terminals of the motor in both a positive and negative direction, resulting in six inductance measurements. The inductance measurements for the three pairs of positive and negative applied voltages are then compared to determine the starting rotor position of the DC motor.

Various embodiments of the present invention provide DC motor controllers. The DC motor controllers include a period detector that is operable to detect a period associated with a DC motor including a plurality of phases. As used herein, the phrase "period detector" is used in its broadest sense to mean any circuit, device or system capable of determining the cycle of operation of an associated machine or device. Based on the disclosure provided herein, one of ordinary skill in the art will recognize a variety of circuits, devices and systems that may be used as period detectors in accordance with embodiments of the present invention. For example, one of ordinary skill in the art will recognize that period detectors currently deployed in hard disk drive systems may be used. Also, as used herein, the term "phase" is used in its broadest sense to mean any portion of an operation. Thus, for example, a phase may be, but is not limited to one phase of a three phase DC motor. Operating the DC motor includes inducing a current in the plurality of phases in accordance with a plurality of commutation states. In some cases, inducing current is accomplished by applying a voltage across one phase or pair of windings to induce a corresponding current. Based on the disclosure provided herein, one of ordinary skill in the art will recognize other approaches that may be used to apply current to a phase in accordance with one or more embodiments of the present invention.

In some cases of the aforementioned embodiments, an interval generator is used. Such an interval generator may be responsible for disaggregating a period detected by the period detector into a number of intervals. In addition, the interval generator may be reconfigured to provide an up/down counter. As used herein, the phrase "up/down counter" is used in its broadest sense to mean any device capable of both incrementing and decrementing. The aforementioned controller embodiments further include an initial commutation state controller that is operable to initialize the up/down counter, induce a current in the plurality of phases in accordance with the first commutation state, and increment the up/down counter until the current achieves a threshold in the first commutation state. Further, the initial commutation state controller is operable to induce a current in the plurality of phases in accordance with the second commutation state, and to decrement the up/down counter until the current achieves the threshold in the second commutation state. The sign bit achieved by incrementing and then decrementing the up/down counter is stored, and used to determine a desired initial commutation state.

Figure 1:
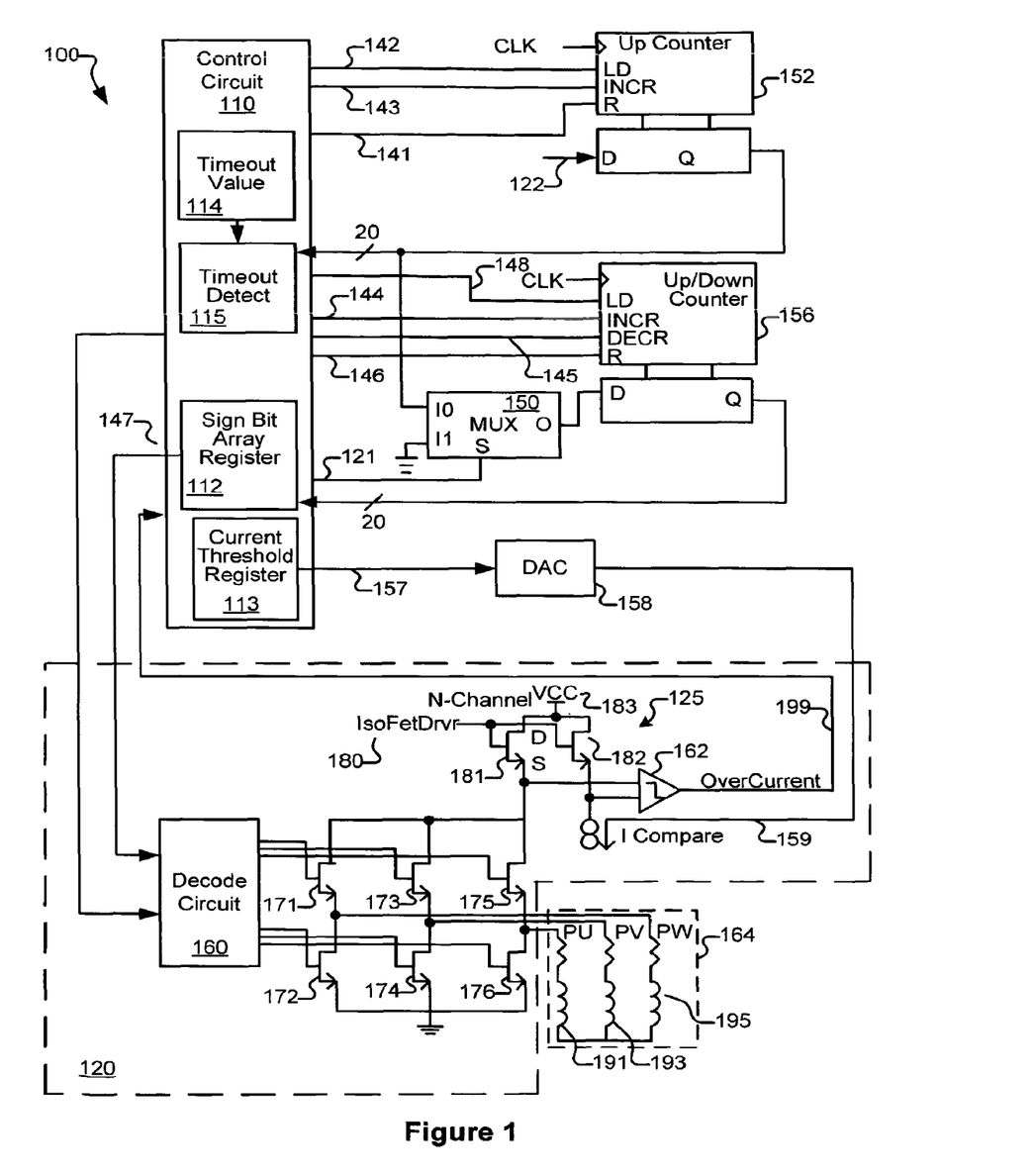
FIG. 1 is a schematic diagram of DC motor controller in accordance with various embodiments of the present invention.

Turning to FIG. 1, a DC motor controller 100 in accordance with various embodiments of the present invention is shown. DC controller 100 includes a control circuit 110 that includes a register 112 designed to hold a three bit array of sign bits, a register 113 designed to hold a current threshold value 157, and a register 114 designed to hold a timeout value 153. By making the current threshold value programmable, a wide range of DC motors and/or associated hard disk drives may be controlled. In addition to control circuit 110, DC motor controller 100 includes an up counter 152, a timeout detector 115, an up/down counter 156, a digital to analog converter 158, and a commutation state detector 120. Commutation state detector 120 includes a decode circuit 160 that is operable to decode the sign bit array maintained in register 112 and based at least in part on the sign bit array of register 112, to direct application of voltage to the various phases (i.e., windings 191, 193, 195) of a three phase DC motor 164. In particular, decode circuit 160 drives the gates of transistors 171, 172, 173, 174, 175, 176 in a sequential fashion resulting in the application of power to motor 164 in a corresponding sequence.

Control circuit 110 may be a general purpose processor or a processor highly tailored for the application disclosed herein. In one particular embodiment of the present invention, control circuit 110 is a state machine that provides control outputs for a up counter 152, an up/down counter 156, a digital to analog converter 158, a multiplexer 150, and a commutation state detector 120. In particular, control circuit 110 is either dynamically or statically programmed with a current limit threshold value 157 via register 113 and a timeout value 153 via register 114. In some embodiments, current limit threshold value 157 and timeout value 153 are seven bit numbers. However, based on the disclosure provided herein, one of ordinary skill in the art will recognize that different numbers of bits may be used to represent threshold values and/or timeout values in accordance with one or more embodiments of the present invention.

In addition, control circuit 110 provides a power up reset signal 141, a load control signal 142 and an increment enable signal 143 to up counter 152; an increment signal 144, a decrement signal 145 and a power-up reset signal 146 to up/down counter 156; and a sign bit array value 147 via register 112 to commutation state detector 120. Commutation state detector 120 includes a decode circuit 160 that is operable to decode sign bit array value 147, and based on the decoded value to control the initial application of power to motor 164 via transistors 171-176. In addition, commutation state detector 120 includes a current detection circuit 125 that is operable to sense a current induced in windings 191, 193, 195 of motor 164, and to compare the received current with an analog representation 159 of current limit threshold value 157 provided via digital to analog converter 158. To perform the aforementioned functionality, current detection circuit 125 includes an input 180 that feeds the gates of two different transistors 181, 182. The sources of transistors 181, 182 feed respective inputs of a comparator 162. In addition, the source of transistor 181 is electrically coupled to the drains of each of transistors 171, 173, 175, and thereby drives current that ultimately traverses windings 191, 193, 195 in accordance with the commutation states to cause the operation of motor 164. The drains of transistors 181, 182 are each electrically coupled to a power source 183.

In operation, DC motor controller 100 initially determines the commutation state of motor 164. This is done by inducing a current (e.g., applying a voltage) to each of the phases of motor 164 and sensing an inductance associated with the induced current. In particular, up counter 152 is loaded with zeros as control circuit 110 asserts load control signal 142. At the same time, the zero input is selected from multiplexer 150 and up/down counter 156 is loaded with these zeros as control circuit 110 asserts load signal 148. Subsequently, control circuit 110 enables up counter 152 and up/down counter 156 to begin counting by asserting increment enable signal 143 and increment enable signal 144. Further, control circuit 110 directs decode circuit 160 to cause a voltage to be applied across windings 191, 193 inducing a current across windings 191, 193 in a first direction. Up/down counter 156 counts upward until the current induced in windings 191, 193 is approximately equivalent to that of an analog representation 159 of current limit threshold value 157. The satisfaction of the aforementioned comparison is indicated to control circuit 110 by a signal 199.

Upon assertion of signal 199, up counter 152 is again loaded with zeros as control circuit 110 asserts load control signal 142. In addition, control circuit 110 enables timeout counter 152 to increment by asserting increment enable signal 143, and control circuit causes up/down counter 156 to being decrementing by asserting decrement enable signal 145. Further, control circuit 110 directs decode circuit 160 to cause a voltage to be applied across windings 191, 193 inducing a current across windings 191, 193 in a direction opposite the previously induced current. Up/down counter 156 then counts downward until the current induced in windings 191, 193 is approximately equivalent to that of analog representation 159 of current limit threshold value 157. The satisfaction of the aforementioned comparison is again indicated to control circuit 110 by signal 199. Upon assertion of signal 199, control circuit 110 stores the sign bit from up/down counter 156 to one bit of register 112. At any time, if up counter 152 exceeds some predetermined value, a circuit error is indicated and the initiation process is timed out.

The aforementioned process of incrementing and decrementing up/down counter is repeated by inducing a current across windings 193, 195 and then across windings 195, 191; and the resulting sign bits from up/down counter 156 are stored as respective bits of an array maintained in register 112. The sign bits of register 112 are provided to decode circuit 160 which decodes the sign bits to determine the present commutation state of motor 164. This present commutation state may then be used to select an initial commutation state for motor 164. For three phase motors, a commutation state one or two states after the present commutation state is chosen. Decode circuit 160 may then begin sequencing through the commutation states associated with motor 164 beginning with the commutation state selected based on the determined commutation state. In this way, the possibility of motor 164 reversing due to an improperly chosen initial commutation state is reduced.

Transistor 182 is designed to sense the current in each phase of motor 164. In some embodiments of the present invention, current sensing is achieved by adding a sense resistor in series with either the ground or the power supply connection of transistors 171-176. The voltage across this resistor can be sensed as a measure of the current through any of the motor phases. In some cases, use of such a sense resistor may incur a few disadvantages. In particular, the additional sense resistor wastes power due to the voltage drop across the resistor. Further, the added sense resistor may require additional package pins in the case where transistors 171-176 do not connect to a common ground or supply pin. Further, the sense resistor may require additional cost and board layout space. Alternatively, where the resistor is implemented on a semiconductor die, it wastes both power and die area.

Some embodiments of the present invention address this potential limitation by using the voltage generated across transistor 181 that is used to disconnect the upper transistors 171-173 from the power supply during an emergency retract situation. Transistor 182 is a sense MOSFET that matches transistor 181 that operates as an isolation transistor, but is scaled by some factor in area. In one particular implementation, the scaling factor is one thousand. Transistor 181 and transistor 182 may have common gate and drain, but have different sources. If a current is pulled from transistor 182, then the source voltage of transistor 181 can be compared against the source voltage of transistor 182 to determine when the current through transistor 181 is equal to that of transistor 182 multiplied by the scale factor (e.g., one thousand). As previously discussed, comparator 162 compares the current through the transistor 181 to a programmable threshold contained in current threshold register 113. The value from current threshold register 113 controls the current source that sinks current from transistor 182. The current limit threshold is reached when the voltage of the source of transistor 181 drops below the voltage of the source of transistor 182, causing comparator 162 to assert signal 199. This provides a method to detect current with minimal required circuitry without wasting power, or adding pins or cost. It should be noted that due to the small voltages generated across transistor 181, in some cases comparator 162 includes an auto-zero function to remove offset.

Figure 2:
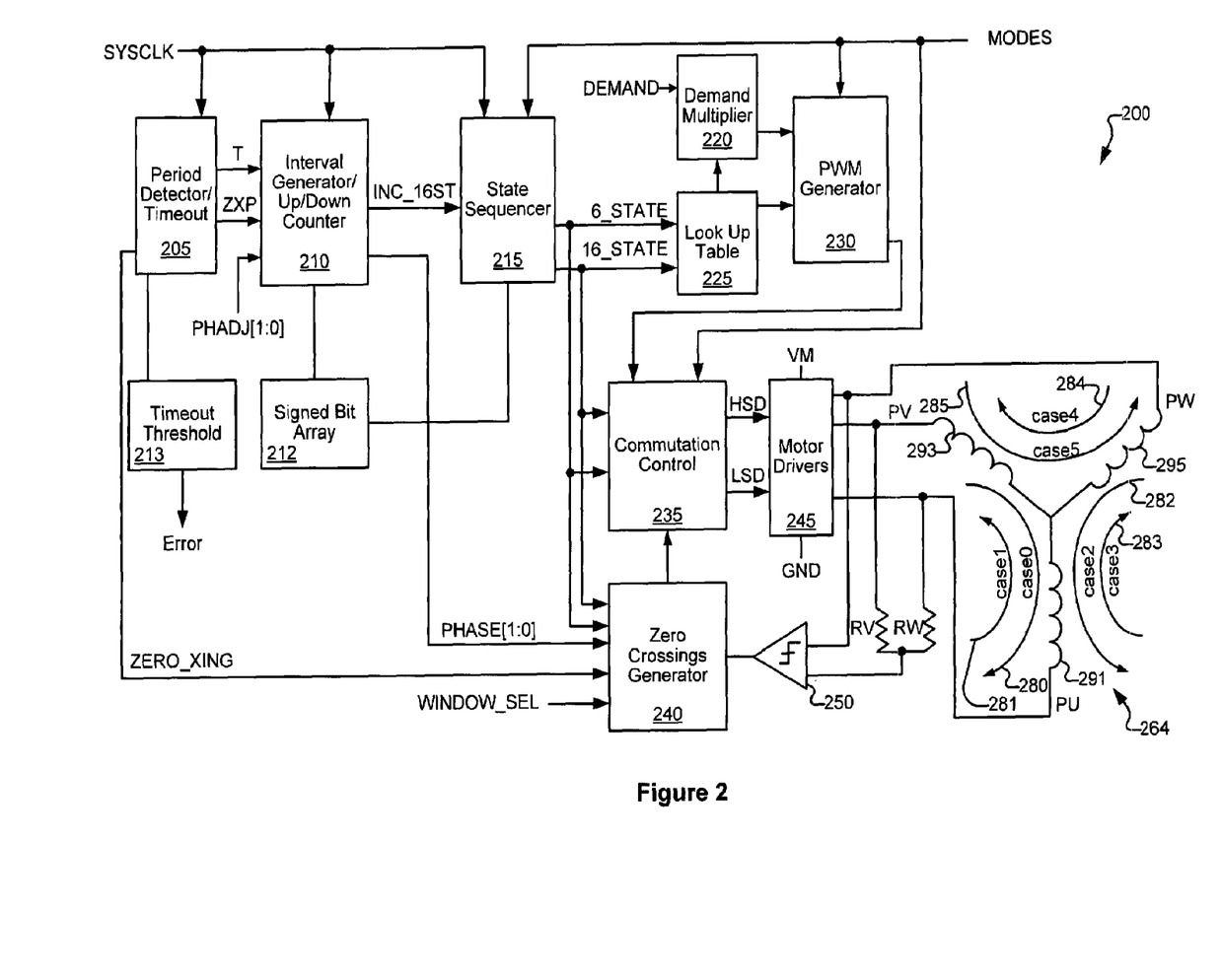
FIG. 2 is a block diagram of a DC motor controller including a reused interval generator in accordance with some embodiments of the present invention.

Turning to FIG. 2, a block diagram of a DC motor controller 200 including a reused interval generator in accordance with some embodiments of the present invention is depicted. DC motor controller 200 includes a number of elements known in the art. Such elements are more fully discussed in U.S. Pat. No. 7,034,478. The aforementioned patent is incorporated herein by reference for all purposes. DC motor controller 200 may be used, for example, to control a hard disk drive spindle motor 264. DC motor controller 200 includes motor drivers 245, a commutation control 235, resistors RV and RW, a comparator 250, a zero crossings generator 240, a combination period detector and timeout counter 205, a combination interval generator and up/down counter 210, a state sequencer 215, a lookup table 225, a demand multiplier 220, and a pulse width modulation (PWM) generator 230, connected as shown in FIG. 2.

Spindle motor 264 is a three-phase DC motor having three terminals each associated with a respective winding 291, 293, 295. Motor drivers 245 may utilize half bridge switches to connect motor windings 291, 293, 295 to either motor power supply terminal VM or ground terminal GND. Commutation control 235 controls motor drivers 245 to generate current having selected waveforms through the windings of spindle motor 264.

When spindle motor 264 is spinning, commutation control 235 operates to sequence the application of power to windings 291, 293, 295 based on an input from state sequencer 215 to maintain the movement of spindle motor 264 as is known in the art. In this condition, combination period detector and timeout counter 205 operates to determine the period of spindle motor 264 as is known in the art, and combination interval generator and up/down counter 210 operates to disaggregate the determined period into smaller sub-periods or intervals as is known in the art.

In contrast, prior to start-up of spindle motor 264, combination period detector and timeout counter 205 operates to generate a timeout error condition. Such a timeout error condition may occur, for example, where the current threshold (discussed above in relation to FIG. 1) is set too high. Combination interval generator and up/down counter 210 operates as an up/down counter. The up/down counter is used in relation to commutation control 235 and state sequencer 215 to determine an optimal starting commutation state for spindle motor 264. In some cases, this optimal commutation state is chosen to avoid reversing the direction of spindle motor 264 upon start-up of the motor. Once the initial commutation state has been identified, the functions of combination period detector and timeout counter 205 and combination interval generator and up/down counter 210 revert to their other function of measuring and capturing the spindle motor zero crossing periods, and interval generation. Thus, some embodiments of the present invention provide for determining the initial commutation state of a motor under control, while requiring only minimal circuitry. This is done by reusing circuitry for initial commutation state detection that is not fundamental during the start-up of the motor under control.

In operation, motor drivers 245 apply a voltage across windings 291, 293, 295 and monitor the time required for a corresponding current in the windings to achieve a threshold value. In particular, a first case 280 involves applying a voltage in the noted direction across windings 291, 293. Up/down counter 210 counts up until the monitored current hits the predetermined threshold value. At that time, motor drivers 245 cause a second case 281 current direction during which up/down counter is decremented until the monitored current hits the predetermined threshold value. At this point, the sign bit of the value in up/down counter 210 remaining after the incrementing and decrementing is stored to a signed bit array 212. This process is repeated for a third case 282 and a fourth case 283 with the resulting sign bit being stored as another bit in signed bit array 212; and for a fifth case 284 and a sixth case 285 with the resulting sign bit being stored as yet another bit in signed bit array 212. The stored sign bits may then be decoded by state sequencer 215 and used to determine an initial commutation state for spindle motor 264. In some cases, the process of incrementing and decrementing the up/down counter is repeated a number of times for each pair of commutation states before the sign bit associated with the pair is stored. Repeating the process a number of times acts as a filter by averaging out any anomalous counts that may be received during the incrementing and decrementing process. In one particular case, the process is repeated sixteen times for each pair of commutation states. This averaging process may be accomplished through reuse of circuitry that is not essential prior to startup of motor 264. In some cases, this averaging process allows circuit 200 to reliably resolve small inductance differences between commutation states. It should be noted that in place of just the sign bit that the actual value of the up/down counter may be stored and used.

Figure 3:
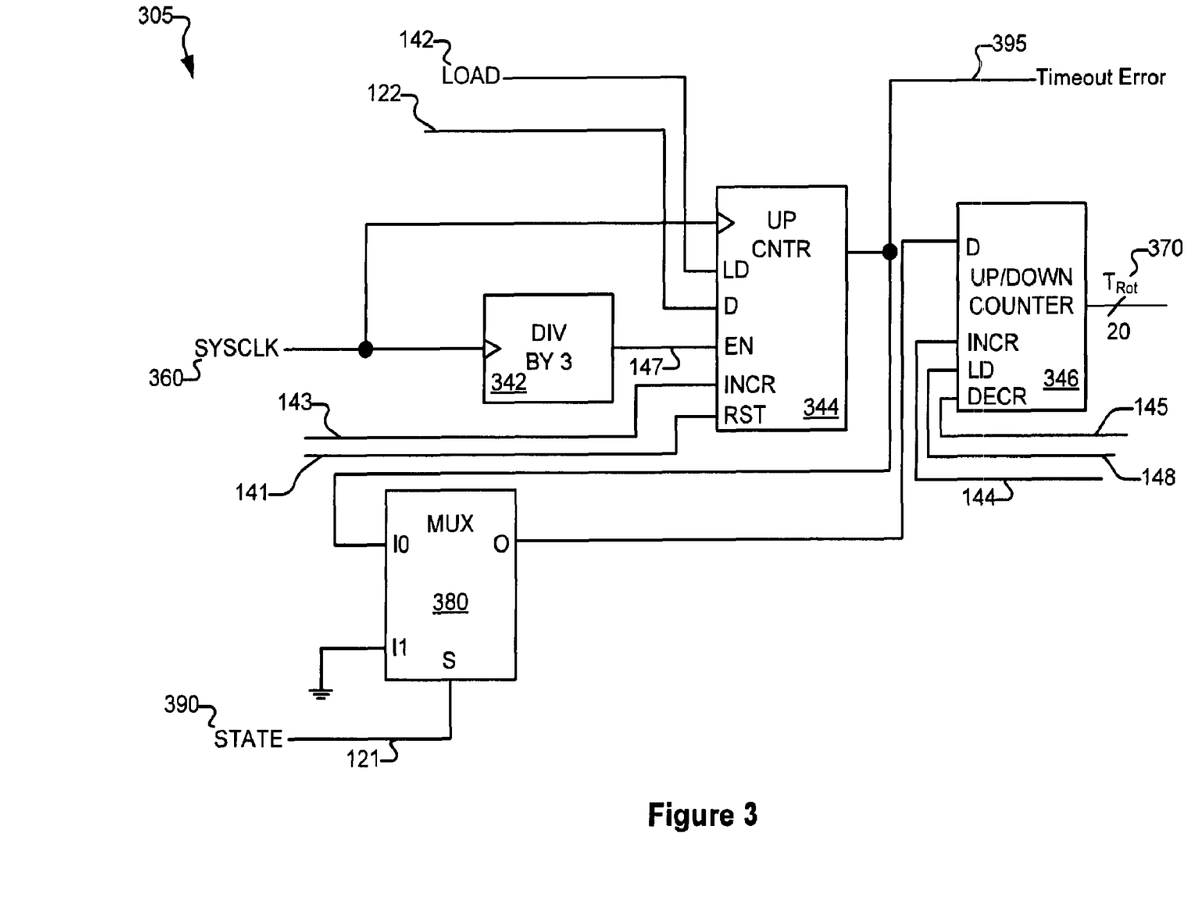
FIG. 3 provide a block diagram of a period detector and timeout counter in accordance with one or more embodiments of the present invention.

Turning to FIG. 3, a block diagram of an exemplary combination period detector and inductance measurement circuit 305 is shown. Based on the disclosure provided herein, one of ordinary skill in the art will appreciate other circuits that may be implemented to perform the dual functions of the aforementioned combination circuits. Combination period detector and inductance measurement circuit 305 includes an up counter 344, a clock divider 342, an up/down counter 346 and a multiplexer 380. In operation, a state input 390 selects whether combination period detector and inductance measurement circuit 305 operates as a period detector or an inductance measurement circuit by selecting the appropriate inputs via mux 380.

When configured to operate as a period detector (i.e., state 390 is asserted low), load control signal 142 is asserted such that an up counter 344 is initialized to zero at the beginning of a period measurement. Clock divider 342 pulses an enable signal 143 after every three clocks of a system clock 360, and thus up counter 344 is incremented every third system clock 390. Further, up counter 344 is reloaded with zeros each time a zero crossing is detected (i.e., each time a zero crossing signal 350 is asserted). Also, whenever a zero crossing is detected, the output of up counter 344 is latched into up/down counter 346. In this way, a count representing the period between zero crossings is continually obtained, and is continually made available at TROT 370 from up/down counter 346.

In contrast, when configured to operate as an inductance measurement circuit (i.e., state 390 is asserted high), load control signal 142 is asserted causing zeros to be loaded into both up counter 344 and up/down counter 346. Up counter 344 then increments every third clock of system clock 360 as provided by clock divider 342. The reset of up counter 344 is used only at power up. The most significant bits of up counter 344 act as a timeout error signal 395 that is compared with timeout register 114 by timeout detect 115. Thus, where up counter is allowed to count for a period longer than that taken to toggle the most significant bits of up counter 344, a timeout error is indicated. As previously discussed, this timeout error is used to limit the amount of time spent waiting for an applied current to reach a threshold value. While up counter 344 is incrementing every third clock, up/down counter increments on every clock until the over-current signal is asserted.

In operation, up/down counter 346 counts up when increment signal 144 is asserted and counts down when decrement signal 145 is asserted. The output of up/down counter 346 is provided to control block 110 which provides at least the most significant bit of the count to sign bit array 112. In a typical operation, after resetting the up/down counter, it is configured as an up counter whenever positive voltages are applied to a motor winding pair, and as a down counter whenever negative voltages are applied to a motor winding pair without an intervening reset. Thus, after testing a pair of commutation states, the up/down counter contains a number representing the difference between an inductance measurement associated with the positive voltage and an inductance measurement associated with the negative voltage (i.e., case 0 minus case 1, case 2 minus case 3, or case 4 minus case 5).

Figure 4:
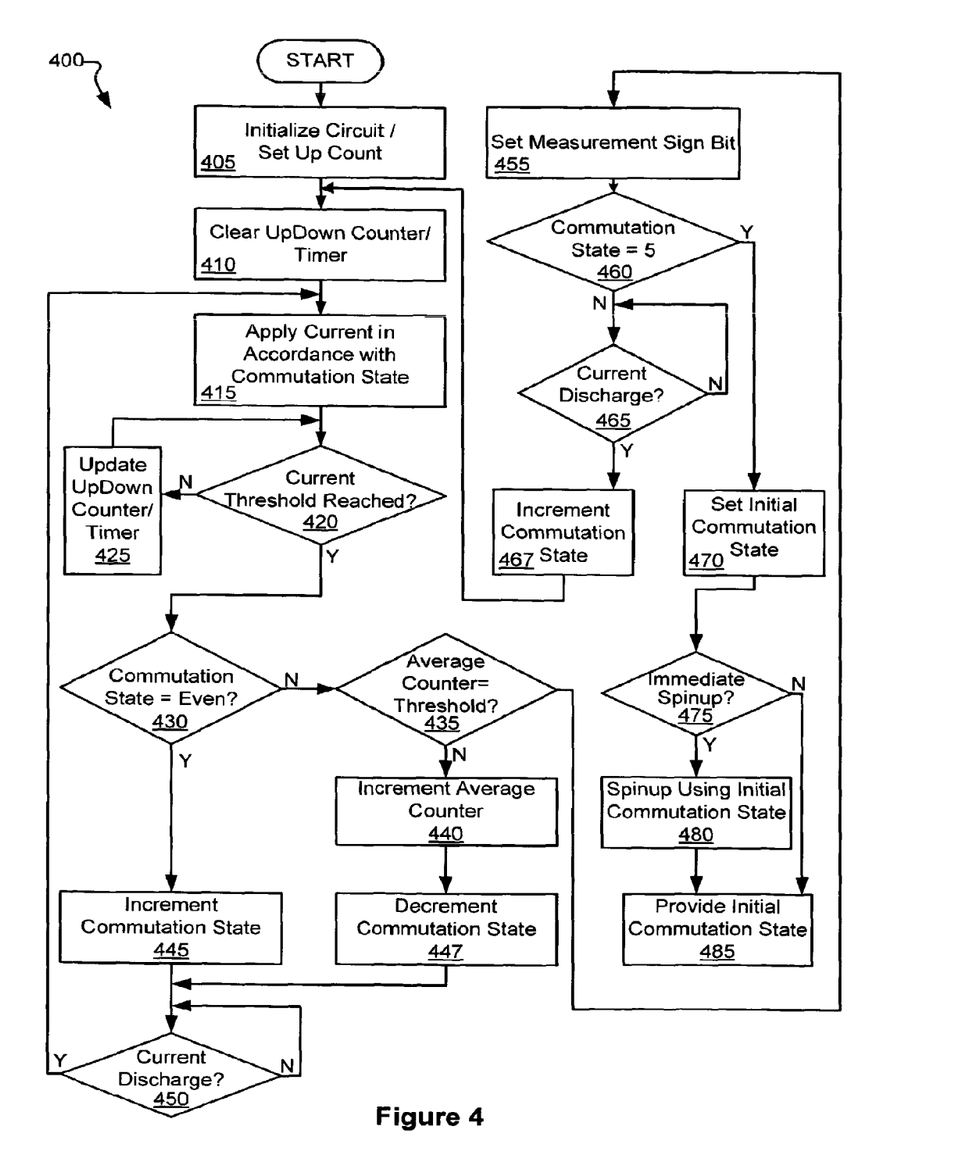
FIG. 4 is a flow diagram depicting a method for initial motor start-up in accordance with various embodiments of the present invention.

Turning to FIG. 4, a flow diagram 400 depicts a method for initial motor start-up in accordance with various embodiments of the present invention. Following flow diagram 400, a control circuit initialization is performed (block 405). This may include configuring up/down counter 346 to operate as an up/down counter, and configuring combination period detector and timeout counter 344 to operate as a timeout counter. Further, register 113 is initialized with a desired current threshold value 157, and register 114 initialized with a desired timeout value 153. The up counter is loaded with zeros by asserting a load enable signal, and the up/down counter is loaded with zeros by asserting a load signal (block 410). A current is then induced in motor 164 in accordance with one commutation state (block 415). Thus, for example, a voltage may be applied across windings 191, 193 to cause current to flow in a positive direction. After the current is induced (block 415), motor 164 is monitored to determine whether a current threshold has been achieved (block 420). In one particular implementation, a one shot is triggered whenever the current limit is achieved. In some cases, once the current limit is reached, the spindle drivers associated with motor 164 are turned off to prevent excessive currents through the motor. The spindle drivers remain off until the next commutation state is selected and tested as set forth below. Where the current threshold has not yet been achieved (block 420), the up/down counter is updated (block 425). This updating includes incrementing the up/down counter when the commutation state is even (e.g., 0, 2, 4 for positive currents), and decrementing the up/down counter when the commutation state is odd (e.g., 1, 3, 5 for negative currents). Thus, for each pair of commutation states (e.g., 0 and 1, 2 and 3, and 4 and 5), the up/down counter is both incremented and decremented.

Once the current threshold is achieved (block 420), it is determined if the commutation state is even (block 430). Where the commutation state is even (block 430), the commutation state is incremented (i.e., from 0 to 1, from 2 to 3, or from 4 to 5) (block 445). In addition, the up/down counter is switched from incrementing to decrementing. A period of time is allowed for the energy in the windings of motor 164 to fully discharge (block 450). Once the energy has discharged (block 450), a current is then induced on motor 164 in accordance with the incremented commutation state (block 415). Thus, for example, where a voltage was previously applied across windings 191, 193 to cause current to flow in a positive direction, the opposite voltage may now be applied to cause a current to flow in a negative direction. After the current is induced (block 415), motor 164 is again monitored to determine whether a current threshold has been achieved (block 420). Where the current threshold has not yet been achieved (block 420), the up/down counter is updated (block 425). In this case, where the previous commutation state called for incrementing the up/down counter, this commutation state will call for decrementing the up/down counter.

Once the current threshold is achieved (block 420), it is again determined if the commutation state is even (block 430). In this case, where the previous commutation state was even, the current commutation state will be odd. Thus, it will be determined whether an averaging threshold has been met (block 435). In some cases, the averaging threshold may cause a commutation state pair to be tested multiple times. In one case, the averaging threshold is sixteen. Where the averaging threshold has not yet been achieved (block 435), an averaging threshold counter is incremented (block 440), the commutation state is decremented (i.e., reset to the first commutation state of the current commutation state pair) (block 447), and the processes of blocks 415 through 450 are repeated until the average threshold count is achieve. Once the average threshold count is achieved (block 435), the sign bit (i.e., most significant bit) of the up/down counter is stored in relation to the previously tested commutation state pair (block 455).

It is then determined if the last commutation state pair has been tested (block 460). This will occur for a system with six commutation states (i.e., states 0-5) when the current commutation state is five. Where the last commutation state has not yet been tested (block 460), a period of time is allowed for the previously induced current to fully discharge (block 467). Once the current has discharged (block 467), the commutation state is incremented (block 467). This incrementing causes the next commutation state pair to be the current commutation state pair. With this selection in place, the processes of blocks 410-460 are repeated for the next commutation state pair, and result in the sign bit being stored in a location designated for the next commutation state pair (block 455).

Once the final commutation state pair has been tested (block 460), the stored sign bits associated with the commutation state pairs are decoded to determine an initial commutation state that will limit the possibility of motor 164 spinning backwards (block 470). Where, for example, the three sign bits are concatenated into a single three bit word, a simple decode may be performed. The following Table 1 shows an exemplary three sign bit output along with a corresponding current location.

TABLE 1

Decoding Commutation State Pair Sign Bits

| Commutation Pair 1 Sign Bit | Commutation Pair 2 Sign Bit | Commutation Pair 3 Sign Bit | Current Commutation State |
|---|---|---|---|
| 0 | 0 | 0 | 6 |
| 0 | 0 | 1 | 2 |
| 0 | 1 | 0 | Illegal (Default 4) |
| 0 | 1 | 1 | 3 |
| 1 | 0 | 0 | 4 |
| 1 | 0 | 1 | Illegal (Default 4) |
| 1 | 1 | 0 | 5 |
| 1 | 1 | 1 | 1 |

Once the decode is complete, it is determined whether motor 164 is to be immediately spun up (block 475), or whether the initial commutation state is only to be provided to a user of the disk driven by motor 164. Where the disk is to be immediately spun up (block 475), power is applied to the determined initial commutation state, and motor 164 begins rotating (block 480). In one particular case, a commutation state two states after the presently detected position is chosen. Other embodiments of the present invention select a commutation state one state after the current position. In any event, the initial commutation state is provided to a user of the disk driven by motor 164 (block 485).

In conclusion, the present invention provides novel systems, devices, methods and arrangements for controlling a DC motor. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A DC motor controller, the controller comprising:
a period detector, wherein the period detector is operable to detect a period associated with a DC motor, wherein the DC motor includes a plurality of phases to which current is applied in accordance with a plurality of commutation states, and wherein the plurality of commutation states includes at least a first commutation state and a second commutation state;
an initial commutation state controller, wherein the initial commutation state controller is operable to:
  initialize an up/down counter;
  induce a first current in the plurality of phases in accordance with the first commutation state;
  increment the up/down counter until the first current achieves a threshold in the first commutation state;
  induce a second current in the plurality of phases in accordance with the second commutation state;
  decrement the up/down counter until the second current achieves the threshold in the second commutation state;
  store the sign bit of the up/down counter; and
  determine a desired initial commutation state based at least in part on the sign bit of the up/down count.

2. The controller of claim 1, wherein the first commutation state and the second commutation state form a first commutation state pair; wherein storing the sign bit of the count includes storing the sign bit as a first sign bit associated with the first commutation pair; wherein the plurality of commutation states further includes a third commutation state, a fourth commutation state, a fifth commutation state and a sixth commutation state; wherein the third commutation state and the fourth commutation state form a second commutation state pair; wherein the fifth commutation state and the sixth commutation state form a third commutation state pair, and wherein the initial commutation state controller is further operable to:
  initialize the up/down counter;
  induce a third current in the plurality of phases in accordance with the third commutation state;
  increment the up/down counter until the third current achieves a threshold in the third commutation state;
  induce a fourth current in the plurality of phases in accordance with the fourth commutation state;
  decrement the up/down counter until the fourth current achieves the threshold in the fourth commutation state;
  store the sign bit of the up/down counter, wherein the sign bit is stored as a second sign bit associated with the second commutation pair;
  induce a fifth current to the plurality of phases in accordance with the fifth commutation state;
  increment the up/down counter until the fifth current achieves a threshold in the fifth commutation state;
  induce a sixth current to the plurality of phases in accordance with the sixth commutation state;
  decrement the up/down counter until the sixth current achieves the threshold in the sixth commutation state;
  store the sign bit of the up/down counter, wherein the sign bit is stored as a third sign bit associated with the third commutation pair; and
  determine a desired initial commutation state based at least in part on the first sign bit, the second sign bit and the third sign bit.

3. The controller of claim 2, wherein the controller further includes a sign bit register, and wherein the first sign bit, the second sign bit and the third sign bit are arranged as a three bit array in the sign bit register, and wherein determining the desired initial commutation state includes decoding the three bit array.

4. The method of claim 3, wherein determining the desired initial commutation state further includes determining the current commutation state, and wherein the desired initial commutation state is at least one commutation state after the current commutation state.

5. A method for controlling a polyphase, brushless DC motor, the method comprising:
providing a DC motor, wherein the DC motor includes a plurality of phases, wherein operating the DC motor includes inducing currents in the plurality of phases in accordance with a plurality of commutation states, and wherein the plurality of commutation states includes at least a first commutation state and a second commutation state;
initializing a count;
inducing a first current to the plurality of phases in accordance with the first commutation state;
incrementing the count until the current achieves a threshold in the first commutation state;
inducing a second current to the plurality of phases in accordance with the second commutation state;
decrementing the count until the second current achieves the threshold in the second commutation state;
storing the sign bit of the count; and
determining a desired initial commutation state based at least in part on the sign bit of the count.

6. The method of claim 5, wherein inducing the first current in accordance with the first commutation state and incrementing the count, and inducing the second current in accordance with the second commutation state and decrementing the count is repeated a programmable number of times before storing the sign bit of the count.

7. The method of claim 6, wherein the programmable number of times is sixteen.

8. The method of claim 5, wherein the first commutation state and the second commutation state form a first commutation state pair; wherein storing the sign bit of the count includes storing the sign bit as a first sign bit associated with the first commutation pair; wherein the plurality of commutation states further includes a third commutation state, a fourth commutation state, a fifth commutation state and a sixth commutation state; wherein the third commutation state and the fourth commutation state form a second commutation state pair; and wherein the fifth commutation state and the sixth commutation state form a third commutation state pair, the method further comprising:
initializing the count;
inducing a third current in the plurality of phases in accordance with the third commutation state;
incrementing the count until the third current achieves a threshold in the third commutation state;
inducing a fourth current in the plurality of phases in accordance with the fourth commutation state;
decrementing the count until the fourth current achieves the threshold in the fourth commutation state;
storing the sign bit of the count, wherein the sign bit is stored as a second sign bit associated with the second commutation pair;
inducing a fifth current in the plurality of phases in accordance with the fifth commutation state;
incrementing the count until the fifth current achieves a threshold in the fifth commutation state;
inducing a sixth current in the plurality of phases in accordance with the sixth commutation state;
decrementing the count until the sixth current achieves the threshold in the sixth commutation state; and
storing the sign bit of the count, wherein the sign bit is stored as a third sign bit associated with the third commutation pair.

9. The method of claim 8, wherein the method further comprises:
determining a desired initial commutation state based at least in part on the first sign bit, the second sign bit and the third sign bit.

10. The method of claim 8, wherein:
inducing the first current in accordance with the first commutation state and incrementing the count, and inducing the second current in accordance with the second commutation state and decrementing the count is repeated a programmable number of times before storing the first sign bit;
inducing the third current in accordance with the third commutation state and incrementing the count, and inducing the fourth current in accordance with the fourth commutation state and decrementing the count is repeated the programmable number of times before storing the second sign bit; and
inducing the fifth current in accordance with the fifth commutation state and incrementing the count, and inducing the sixth current in accordance with the sixth commutation state and decrementing the count is repeated a programmable number of times before storing the third sign bit.

11. The method of claim 10, wherein the programmable number of times is sixteen.

12. The method of claim 6, wherein the first sign bit, the second sign bit and the third sign bit are arranged in a three bit array, and wherein determining the desired initial commutation state includes decoding the three bit array.

13. The method of claim 12, wherein determining the desired initial commutation state further includes determining the current commutation state, and wherein the desired initial commutation state is at least one commutation state after the current commutation state.

14. A DC motor system, the system comprising:
a DC motor, wherein the DC motor includes a plurality of phases, wherein operating the DC motor includes applying a voltage to the plurality of phases in accordance with a plurality of commutation states, and wherein the plurality of commutation states includes at least a first commutation state and a second commutation state;
an initial commutation state controller, wherein the initial commutation state controller includes an up/down counter, and wherein the initial commutation state controller is operable to:
initialize the up/down counter;
apply a voltage to the plurality of phases in accordance with the first commutation state;
increment the up/down counter until a first current corresponding to the voltage achieves a threshold in the first commutation state;
apply the voltage to the plurality of phases in accordance with the second commutation state;
decrement the up/down counter until a second current corresponding to the voltage achieves the threshold in the second commutation state;
store the sign bit of the up/down counter; and
determine a desired initial commutation state based at least in part on the sign bit of the up/down counter.

15. The system of claim 14, wherein applying the voltage in accordance with the first commutation state and incrementing the up/down counter, and applying the voltage in accordance with the second commutation state and decrementing the up/down counter is repeated a programmable number of times before storing the sign bit of the up/down counter.

16. The system of claim 15, wherein the programmable number of times is sixteen.

17. The system of claim 14, wherein the first commutation state and the second commutation state form a first commutation state pair; wherein storing the sign bit of the up/down counter includes storing the sign bit as a first sign bit associated with the first commutation pair; wherein the plurality of commutation states further includes a third commutation state, a fourth commutation state, a fifth commutation state and a sixth commutation state; wherein the third commutation state and the fourth commutation state form a second commutation state pair; wherein the fifth commutation state and the sixth commutation state form a third commutation state pair, and wherein the initial commutation state controller is operable to:

initialize the up/down counter;
 apply the voltage to the plurality of phases in accordance with the third commutation state;
 increment the count until a third current corresponding to the voltage achieves a threshold in the third commutation state;
 apply the voltage to the plurality of phases in accordance with the fourth commutation state;
 decrement the up/down counter until a fourth current corresponding to the voltage achieves the threshold in the fourth commutation state;
 store the sign bit of the up/down counter, wherein the sign bit is stored as a second sign bit associated with the second commutation pair;
 apply the voltage to the plurality of phases in accordance with the fifth commutation state;
 increment the up/down counter until a fifth current corresponding to the voltage achieves a threshold in the fifth commutation state;
 apply the voltage to the plurality of phases in accordance with the sixth commutation state;
 decrement the up/down counter until a sixth current corresponding to the voltage achieves the threshold in the sixth commutation state; and
 store the sign bit of the up/down counter, wherein the sign bit is stored as a third sign bit associated with the third commutation pair.

18. The system of claim 17, wherein the initial commutation state controller is operable to:

determine a desired initial commutation state based at least in part on the first sign bit, the second sign bit and the third sign bit.

19. The system of claim 16, wherein the system further includes a sign bit register, and wherein the first sign bit, the second sign bit and the third sign bit are arranged as a three bit array in the sign bit register, and wherein determining the desired initial commutation state includes decoding the three bit array.

20. The system of claim 19, wherein determining the desired initial commutation state further includes determining the current commutation state, and wherein the desired initial commutation state is at least one commutation state after the current commutation state.

21. The system of claim 17, wherein determining that a current threshold has been achieved is accomplished by sensing a voltage drop across a transistor.

* * * * *